US008678767B2

(12) United States Patent
Mok (10) Patent No.: US 8,678,767 B2
(45) Date of Patent: Mar. 25, 2014

(54) WIND TURBINE

(76) Inventor: Peter Mok, Fremont, CA (US)

( * ) Notice: Subject to any disclaimer, the term of this patent is extended or adjusted under 35 U.S.C. 154(b) by 462 days.

(21) Appl. No.: 13/083,432

(22) Filed: Apr. 8, 2011

(65) Prior Publication Data

US 2012/0257974 A1 Oct. 11, 2012

(51) Int. Cl.
*F03D 1/02* (2006.01)

(52) U.S. Cl.
USPC .................. 416/142; 416/147; 416/201 A (58) Field of Classification Search
USPC .... 416/124, 132 B, 142, 143, 201 A, DIG. 6, 416/147; 290/44, 55
See application file for complete search history.

(56) References Cited

U.S. PATENT DOCUMENTS

| | | | | | |
|---|---|---|---|---|---|
| 1,178,729 | A | * | 4/1916 | Kemble | 416/11 |
| 1,266,518 | A | * | 5/1918 | Mulrony | 416/124 |
| 1,498,978 | A | * | 6/1924 | Muntz | 416/85 |
| 5,506,453 | A | * | 4/1996 | McCombs | 290/44 |
| 7,066,709 | B2 | * | 6/2006 | Kim et al. | 415/4.3 |
| 7,071,578 | B1 | * | 7/2006 | Shibata et al. | 290/55 |
| 7,074,011 | B1 | * | 7/2006 | Wobben | 416/126 |
| 2005/0118027 | A1 | * | 6/2005 | Joo | 416/201 A |
| 2008/0012347 | A1 | * | 1/2008 | Rozmus | 290/55 |
| 2010/0189561 | A1 | | 7/2010 | Vettese | |
| 2011/0038728 | A1 | * | 2/2011 | Elkin et al. | 416/31 |
| 2011/0211957 | A1 | * | 9/2011 | Folsom et al. | 416/41 |

FOREIGN PATENT DOCUMENTS

| | | | |
|---|---|---|---|
| DE | 100 03 385 A1 | | 8/2001 |
| EP | 1 375 913 A1 | | 1/2004 |
| FR | 868 278 A | | 12/1941 |
| JP | 55-148978 | * | 11/1980 |
| JP | 59 176462 A | | 10/1984 |
| JP | 2010-071277 | * | 4/2010 |
| WO | WO 96/00349 A1 | | 1/1996 |
| WO | WO 2007/057021 | * | 5/2007 |
| WO | WO 2010/021732 A2 | | 2/2010 |

OTHER PUBLICATIONS

Kamimura, Wind Power Generator, Nov. 19, 1980, Abstract of JP 55-148978.*
Tamotsu, Storing Double-action Wind Power Generator, Apr. 2, 2010, Abstract of JP 2020-071277.*
E. Muljadi and C.P. Butterfield, Pitch-Controlled Variable-Speed Wind Turbine Generation, NREL/CP-500-27143, Feb. 2000.
Proven 7 Wind Turbine, Turbine Serivces (wind-hyro) Ltd., from web page at http://www.turbineservices.co.uk/wind-turbines/proven/proven-3-kw/; Mar. 4, 2011.

* cited by examiner

*Primary Examiner* — Edward Look
*Assistant Examiner* — Liam McDowell
(74) *Attorney, Agent, or Firm* — Douglas L. Weller (57) ABSTRACT

A wind turbine includes two sets of blades. A first set of blades is placed at a front location of the wind turbine. A second set of blades is placed behind the first set of blades. The first set of blades turns in an area within a first circumference. The second set of blades are mounted at a location sufficiently away from an axis of rotation of the wind turbine so that the second set of blades turns within an area that is within a second circumference and that is substantially outside the first circumference.

20 Claims, 12 Drawing Sheets

WIND TURBINE

BACKGROUND

Wind turbines are modern windmills used for power generation. While large wind turbines, often as tall as 90 meters are arranged in wind farms that generate larges amounts of power, smaller turbine units can be used to generate power sufficient for residential use and other applications that require less power generation.

DESCRIPTION OF THE EMBODIMENT

Figure 1:
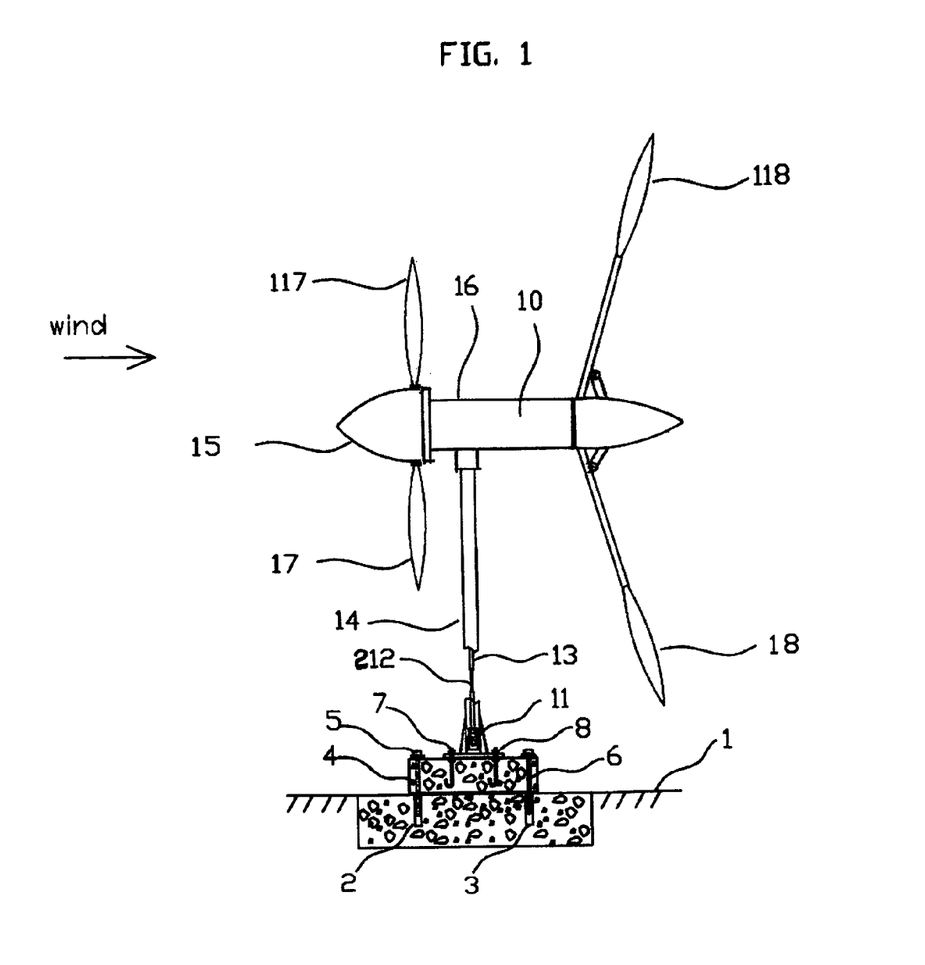
FIG. 1 is a simplified illustration of a wind turbine with two sets of blades in accordance with an embodiment of the disclosure.

FIG. 1 is a simplified illustration of a wind turbine 10. A tower 14 of wind turbine 10 is anchored to an upper foundation 4 attached to a lower foundation 1, for example using a screw 5 and a screw 6 respectfully attached to an anchor 2 and an anchor 3. Within a hollow region of tower 14 a rigid wire container 13 contains wires 212 that carry electricity generated by wind turbine 10. For example, rigid wire container 13 can be PVC pipe. As wind turbine 10 rotates around tower 14 to face the wind, wire container 13 rotates with wind turbine 10. A slip-ring 11 towards the bottom of tower 14 is used to provide contact with external wires. The location of slip ring 11 towards the bottom of tower 14 facilitates servicing slip ring 11 without taking down wind turbine 10.

Wind turbine 10 includes a front set of blades 17 and 117. Wind turbine also includes a back set of blades 18 and 118, mounted respectively on an extension support 19 and an extension support 119. Wind turbine 10 also includes a front cap 15 and a body cover 16.

While FIG. 1 shows two front blades 17 and 117 and two back blades 18 and 118, this is only meant to be illustrative. Wind turbine 10 can include, for example, two, three, four or some other number of front blades, dependent upon design considerations. Likewise, wind turbine 10 can include, for example, two, three, four or some other number of back blades, dependent upon design considerations.

Figure 2A:
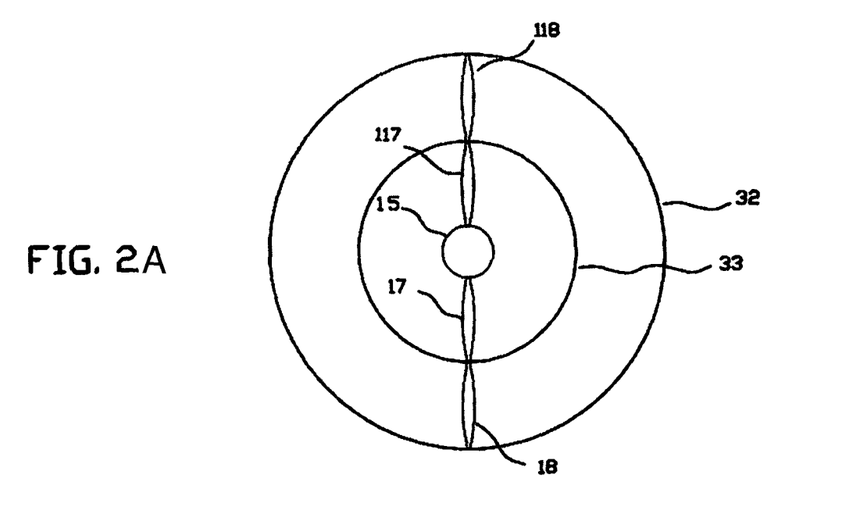
FIG. 2A and FIG. 2B are simplified front views of different embodiments of the wind turbine shown in FIG. 1 providing additional information about the arrangement of blades.
Figure 2B:
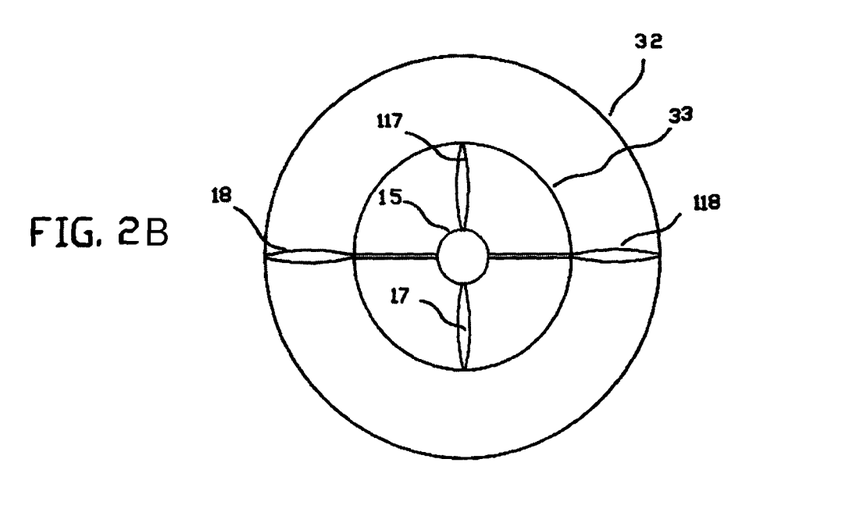

FIG. 2A and FIG. 2B provide additional information about the arrangement of blades for wind turbine 10. As illustrated by FIG. 2A and FIG. 2B, the front blades and the back blades have been arranged to efficiently capture the wind. Wind within a circumference 33 impacts front blades 17 and 117. Wind outside circumference 33 and within a circumference 32 impacts back blades 18 and 118. For low wind velocities, back blades 18 and 118 provide an expanded area in which wind is captured. During periods or gusts of high winds, back blades 18 and 118, fold lessening the impact of high wind on wind turbine 10.

In FIG. 2A, front blades 17 and 117 are shown to be in line with back blades 18 and 118. FIG. 2B shows an alternative embodiment where front blades 17 and 117 are 90 degrees offset from back blades 18 and 118.

In both the arrangement of front blades 17 and 117 and back blades 18 and 118, as shown in both FIG. 2A and FIG. 2B, front blades 17 and 117 are turning in a different blade area than back blades 18 and 118. That is, front blades 17 and 117 are turning in an area within circumference 33. Back blades 18 and 118 are mounted at a location sufficiently away from an axis of rotation of the wind turbine 10 so that back blades 18 and 118 turn within circumference 32 within an area that is outside (or at least substantially outside) circumference 33. Because front blades 17 and 117 are turning in a different area than back blades 18 and 118, this lessens the air turbulence experienced by the blades and thus the audible noise created by wind turbine 10.

Figure 3A:
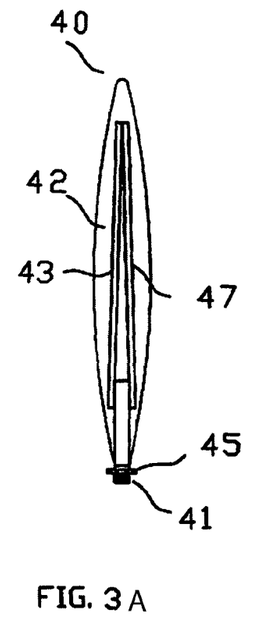
FIG. 3A and FIG. 3B provide information of blade design for the wind turbine shown in FIG. 1 in accordance with an embodiment of the disclosure.
Figure 3B:
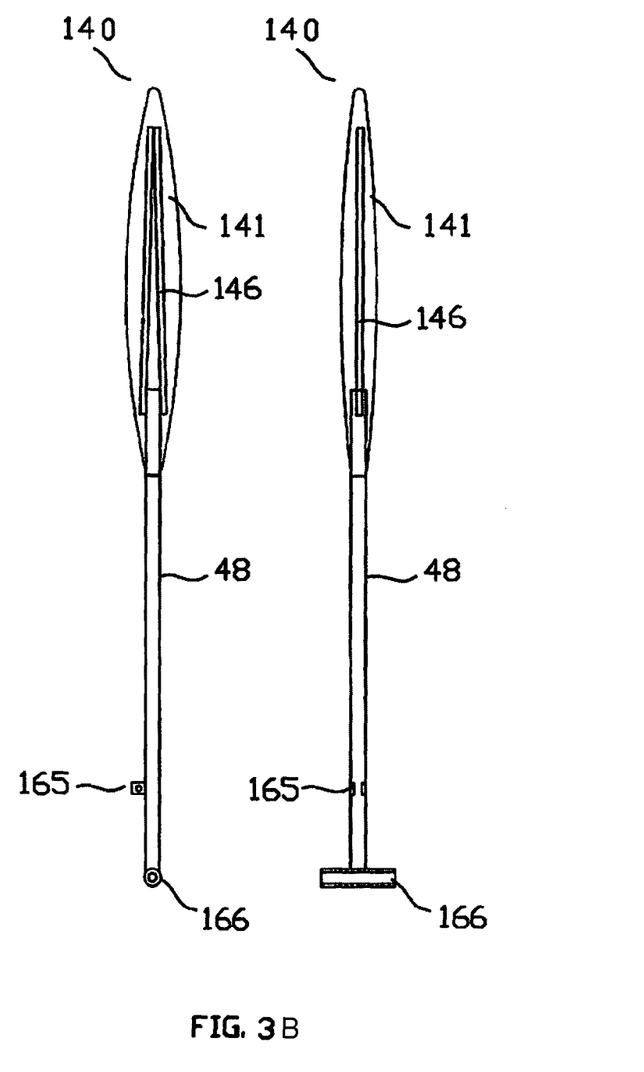

FIG. 3A and FIG. 3B provides information of blade design for wind turbine 10. Blade 40 is an example of the construction of a shorter blade. An attachment area 41 is where blade 40 attaches to a rotor of wind turbine 10. For example, attachment area 41 is composed of metal and is threaded allowing blade 40 to be rigidly attached to a blade base shaft. Reinforcement material 43 and 47 extending most of the length of blade 40 is included to provide rigidity to blade 40 and is composed, for example of metal such as stainless steel, galvanized steel or aluminum. The remainder of blade 40 can be composed of inexpensive material 42, which is, for example, polyurethane obtained from recycled grocery bags.

FIG. 3B shows two views of a blade 140. The views are rotated ninety degrees around a vertical axis with respect to each other. Attachment area 166 is where an extension support 48 of blade 140 attaches to a rotor of wind turbine 10. Attachment area 165 is where extension support 48 attaches to a control arm. Extension support 48 allows blade 140 to be positioned at a radial distance outside the shorter blade. For example, extension support 48 is a tube composed of metal such as galvanized steel, stainless steel or aluminum. Within blade 140, reinforcement material 146 extends most of the length of blade 140. Reinforcement material 146 is included to provide rigidity to blade 140 and is composed, for example, of metal such as galvanized steel, stainless steel or aluminum. The remainder of blade 140 can be composed of inexpensive material 141, which is, for example, polyurethane.

Figure 4:
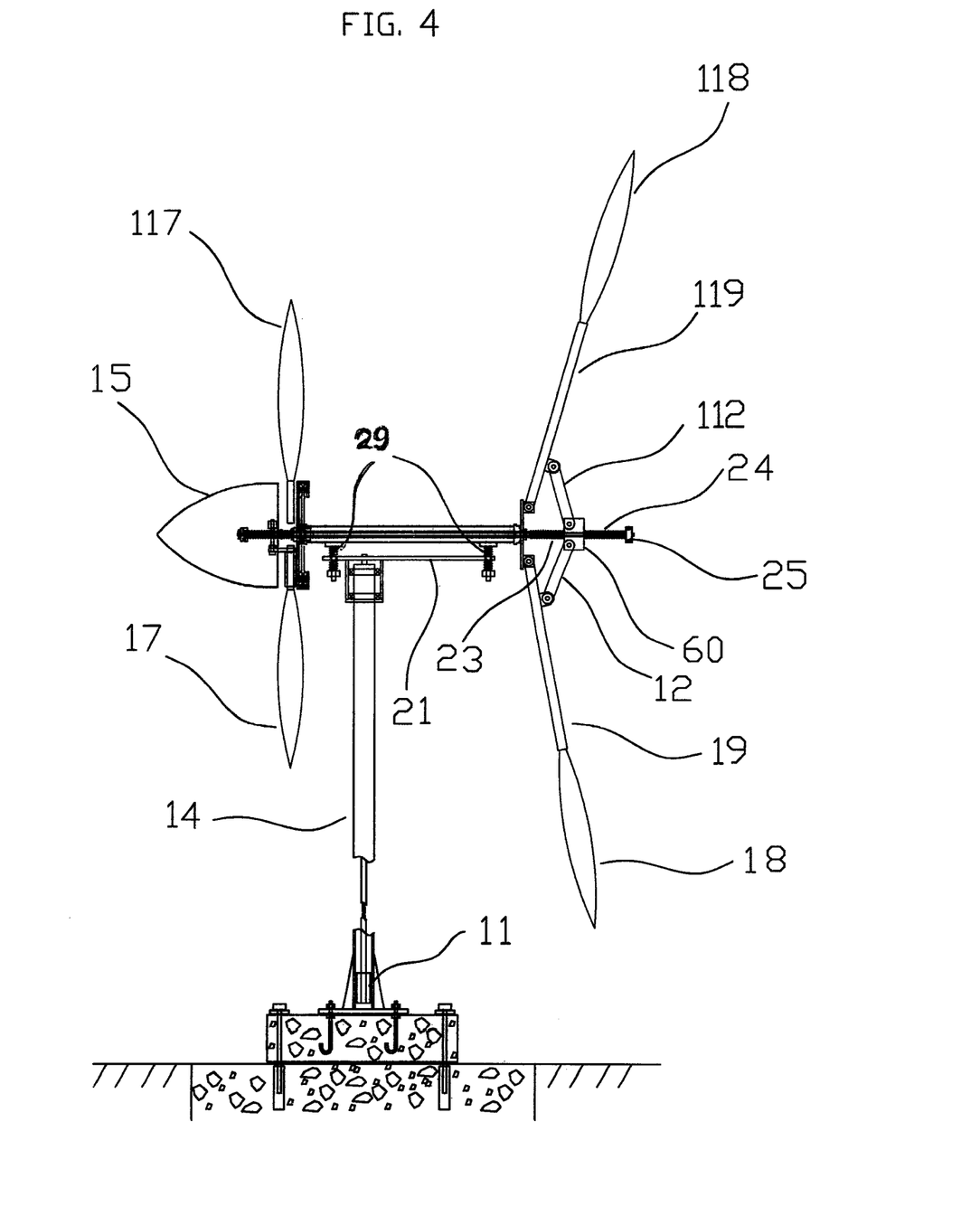
FIG. 4 provides additional construction details of the wind turbine shown in FIG. 1 in accordance with an embodiment of the disclosure.

In FIG. 4, cover 16 has been removed from wind turbine 10, revealing additional construction details. In order to prevent damage to wind turbine 10 during periods of high wind, wind turbine 10 is constructed so that high wind pushes blade 118 and blade 18 into a folded position. As wind from the front of wind turbine 10 pushes against blades 18 and 118, a slider 60—connected to extension support 19 by an arm 12 and to extension support 119 by an arm 112—pushes back and compresses a spring 24 against a stop 25. Additional details are shown in FIG. 4. Isolation materials 29, composed of, for example, rubber, provides isolation between wind turbine 10 and tower 14 thereby dampening vibrations before they reach tower 14.

Figure 5:
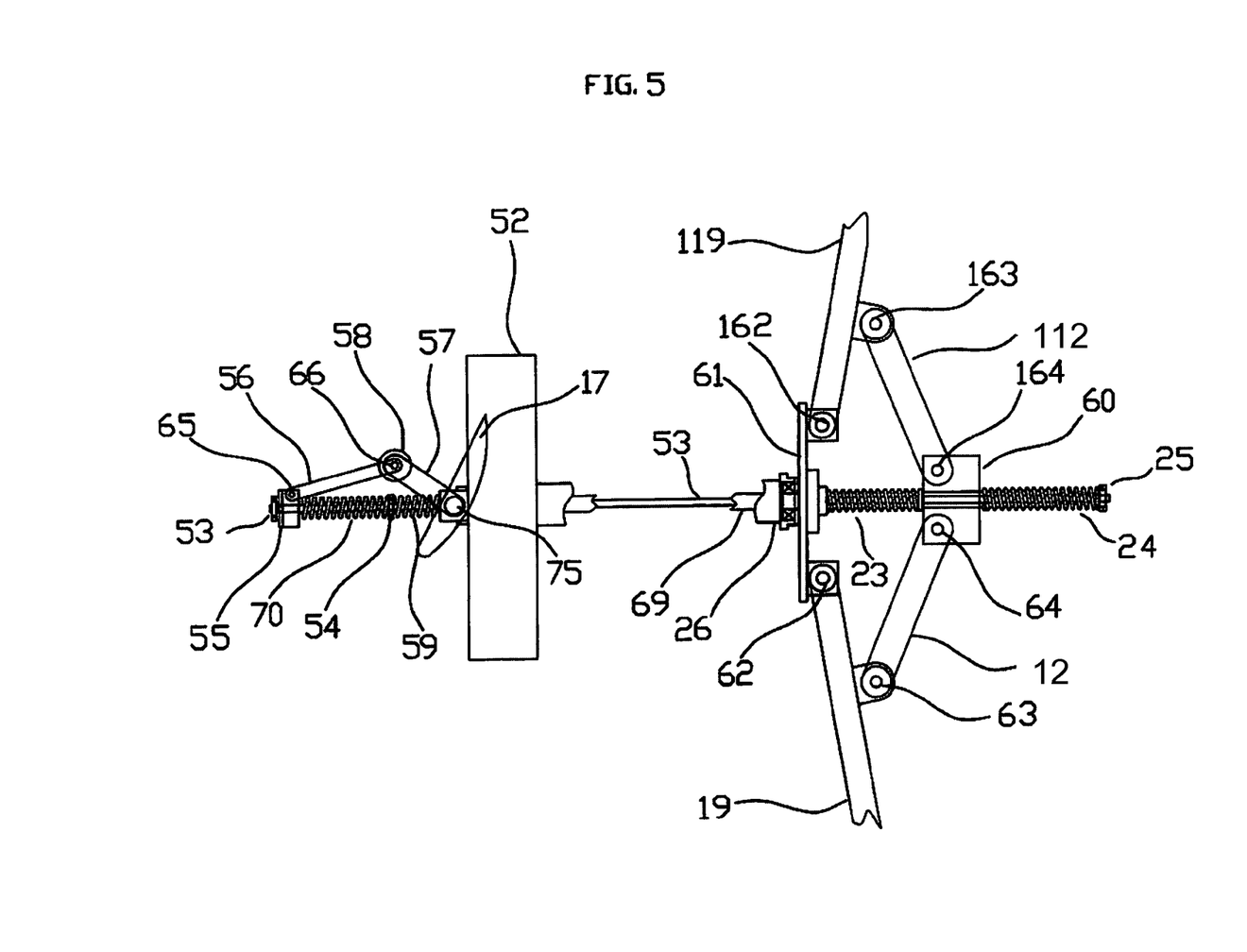
FIG. 5, FIG. 6, FIG. 7, FIG. 8 and FIG. 9 illustrate how blade pitch in the front blades are varied to limit rotational velocity of the wind turbine shown in FIG. 1 in accordance with an embodiment of the disclosure.

As can be seen from FIG. 5, arm 12 is connected at a pivot joint 64 to slider 60 and is connected at a pivot joint 63 to extension support 19. Extension support 19 is connected by a pivot joint 62 to a rotor base 61. Likewise, arm 112 is connected at a pivot joint 164 to slider 60 and is connected at a pivot joint 163 to extension support 119. Extension support 119 is connected by a pivot joint 162 to rotor base 61. Arm 12 and arm 112 are both connected to slider 60 to assure blade 18 and 118 synchronously fold and unfold.

As a strong wind tends to push blade 18 and blade 118 back behind wind turbine 10, slider 60 compresses spring 24 against a stop 25 allowing blade 18 and blade 118 to fold back behind wind turbine 10. The amount of wind required to push blade 18 and blade 118 behind wind turbine 10 is dependent upon the amount of force required to compress spring 24. For example, spring 24 may be selected so that at a wind velocity of thirty miles per hour blade 18 and blade 118 will be folded to be within circumference 33 shown in FIG. 2.

Figure 6:
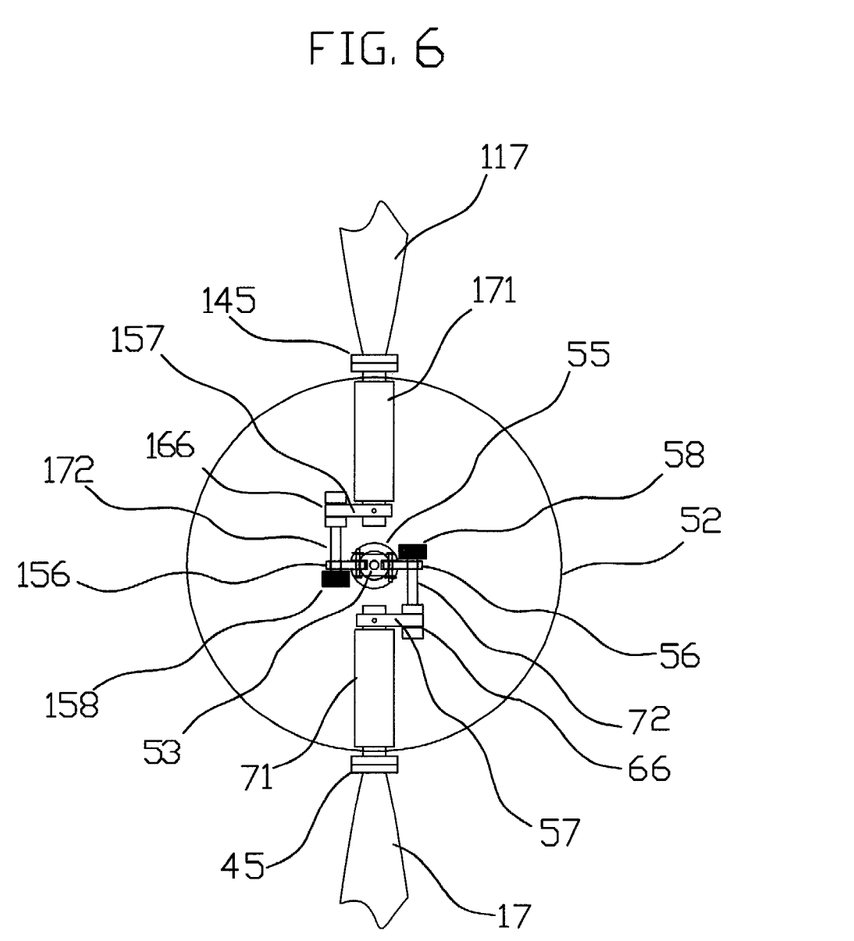

Rotor base 61 is connected to a hollow shaft 69 having a shaft housing 26. Hollow shaft 69 and shaft housing 26 extend to, and hollow shaft 69 is connected to, a rotor 52. As shown by FIG. 6, blade 17 and blade 117 are also connected to rotor 52.

A pitch control rod 51 extends from stop 25 through spring 24, slider 60, stabilizing spring 23, rotor base 61, hollow shaft 69, rotor 52, a spring 59, a spring 70, a slider 55 until a stop 53. A stop collar 54 separates spring 70 from spring 59. An arm 57 is rigidly attached to a bottom of blade 17. A weight 58 is located at a pivot joint 66. An linkage 56 connects to slider 55 at a pivot joint 65.

When there is only light wind, spring 70 keeps slider 55 pressed against stop 53. As wind increases, blades 17 and 117 increase the rotational velocity of rotor 52. Centrifugal force generated by the rotation of rotor 52 tends to push weight 58 outward from the center of rotation. As weight 58 moves outward, slider 55 slides away from stop 53 towards rotor 52. This decreases the angle between linkage 56 and arm 57. Since there is a rigid joint between arm 57 and blade 17, decreasing the angle between linkage 56 and arm 57 changes the pitch of blade 17. The smaller the angle between linkage 56 and arm 57, the more parallel blade 17 is towards the wind. This change of pitch of blades 17 and the concurrent change of pitch of 117 to be more parallel to the wind tends to slow down the rotation of wind turbine 10.

Additionally, in strong winds blades 18 and 118 fold back. As blades 18 and 118 fold back, the compression of spring 24 against stop 25 tends to pull pitch control rod 51 backwards, compressing spring 59 between stop collar 54 and rotor 52. Compression of spring 59 further decreases the angle between linkage 56 and arm 57 and changing the pitch of blades 17 and 117 so that blades 17 and 117 are more parallel to the wind. Thus when a gust of wind hits wind turbine 10, this will thrust blades 18 and 118 backwards pulling pitch rode 51 backwards, compressing spring 59 between stop collar 54 and rotor 52, thereby changing pitch of blades 17 and 117 in addition to the pitch control activated by rotation of rotor 52. This provides extra protection for wind turbine 10 in gusty wind situations.

Figure 7:
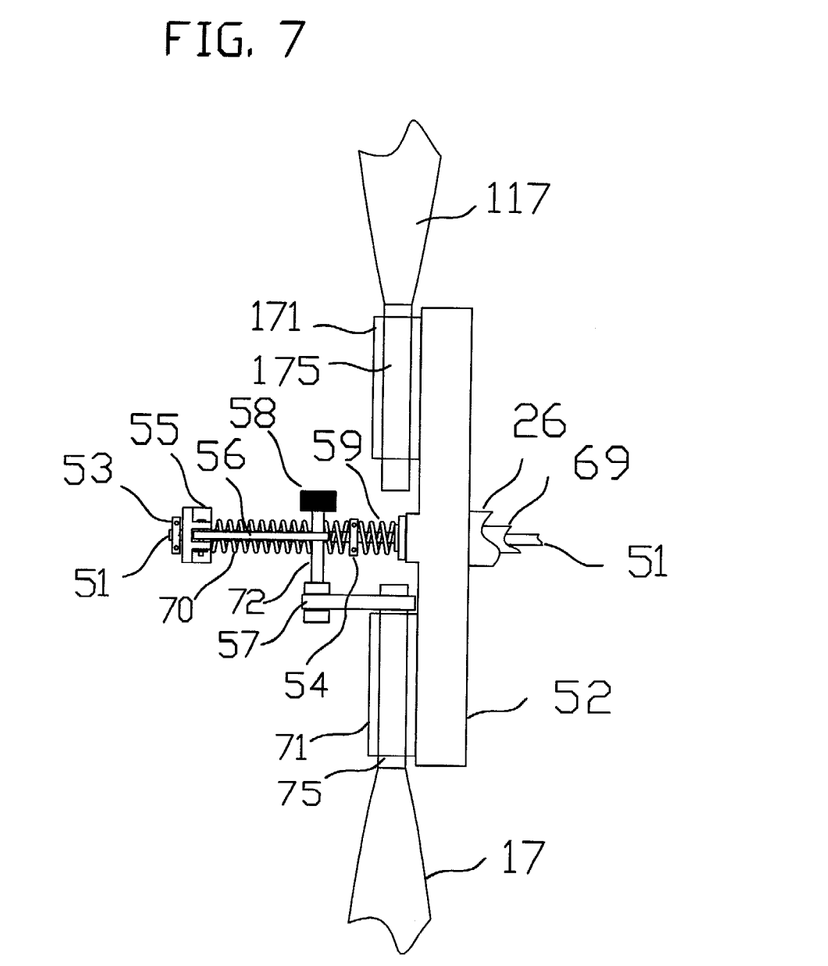

FIG. 6 and FIG. 7 provide additional information about how blades 17 and 117 are attached to rotor 52. As shown in FIG. 6 and FIG. 7, a blade base shaft 75 immovably attached to blade 17 rotates within a mounting housing 71 attached to rotor 52. At pivot joint 66, a rod 72 connects arm 57 to weight 58 and to linkage 56. Likewise, a blade base shaft 175 immovably attached to blade 117 rotates within a mounting housing 171 attached to rotor 52. At pivot joint 166, a rod 172 connects an arm 157 to a weight 158 and to a linkage 156.

Figure 8:
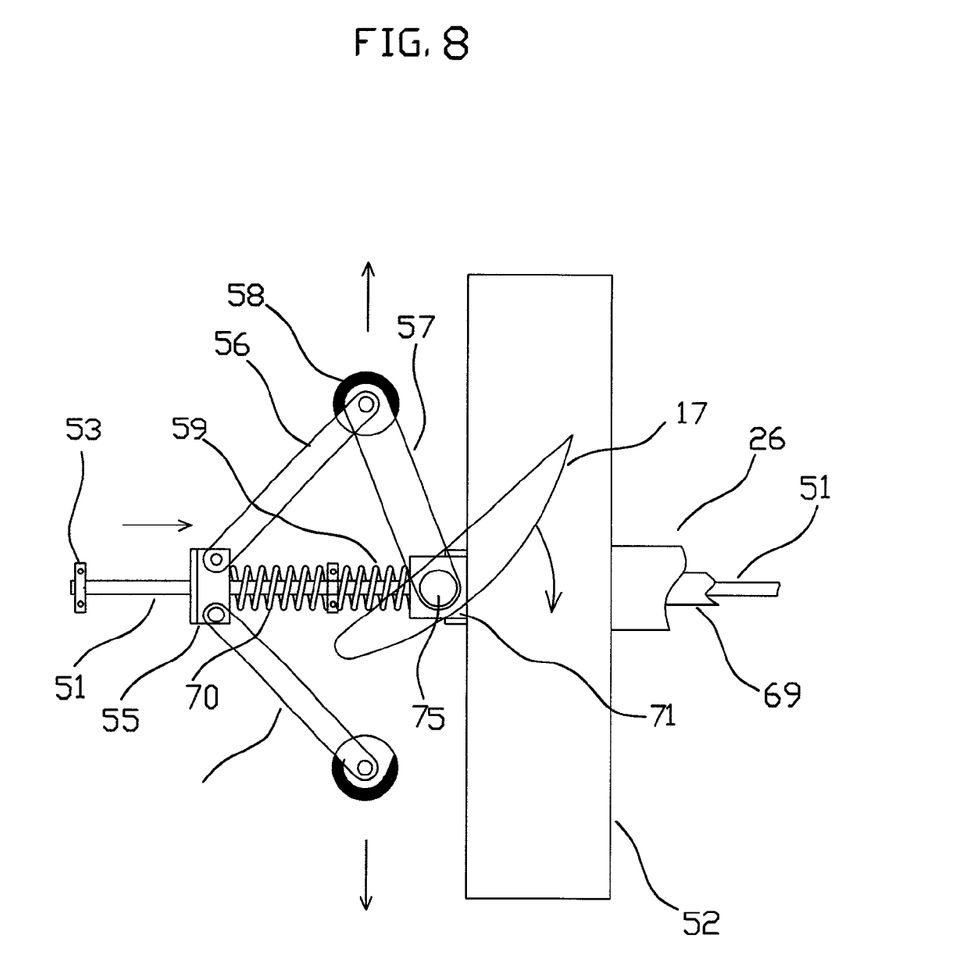

FIG. 8 shows the result when rotor 52 rotates at a sufficient velocity that centrifugal force at weight 58 has pulled weight 58 outward. Slider 55 has slid away from stop 53 towards rotor 52. This has decreased the angle between linkage 56 and arm 57. Since there is a rigid joint between arm 57 and blade 17, the angle between linkage 56 and arm 57 has decreased changing the pitch of blade 17.

Figure 9:
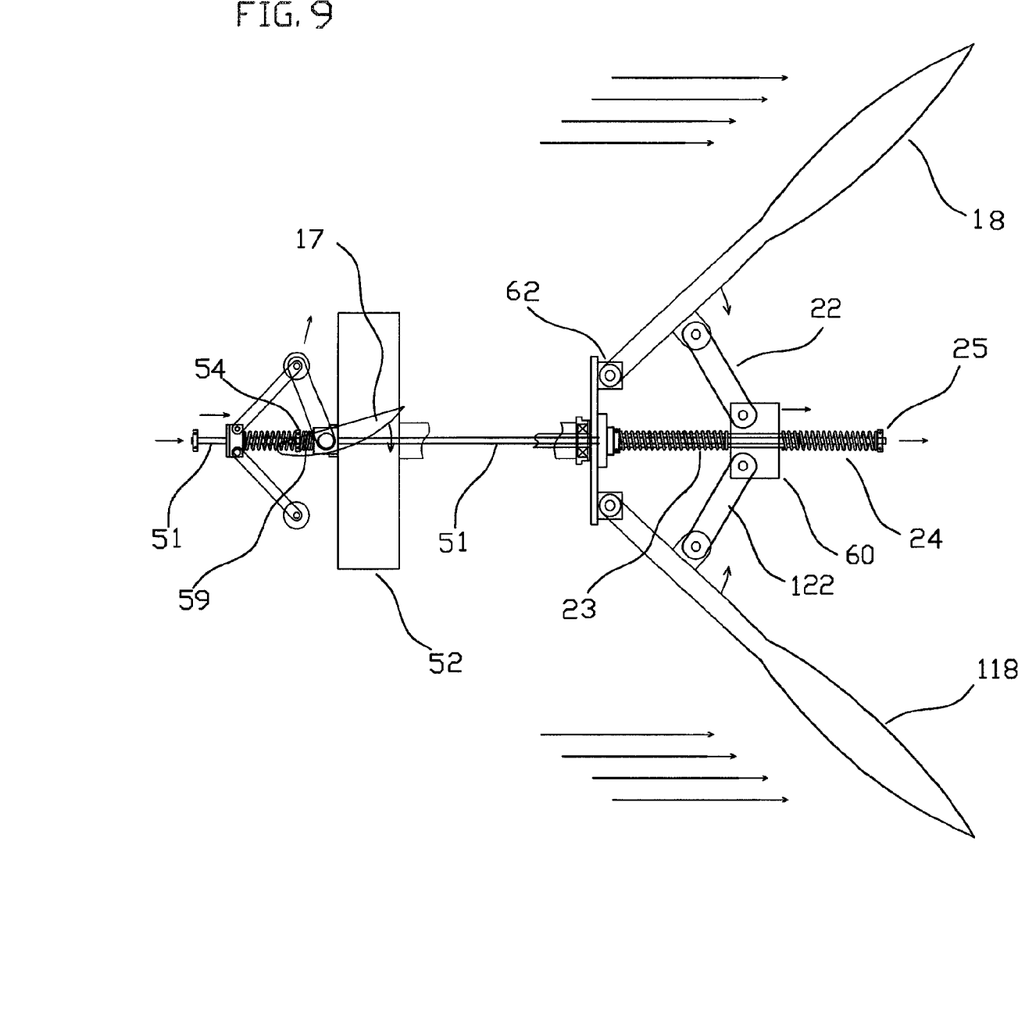

FIG. 9 shows the result when the wind is sufficiently strong that blade 18 (and blade 118) fold back. The compression of spring 24 against stop 25 has pulled pitch control rod 51 backwards, compressing spring 59 between stop collar 54 and rotor 52. Compression of spring 59 decreases the angle between linkage 56 and arm 57 and changes the pitch of blades 17 and 117 so that blades 17 and 117 are more parallel to the wind. This provides extra protection for wind turbine 10 in gusty wind situations and decreases the wind force to blade 18, blade 118 and tower 14. Because in the folded back position the rotation circumference defined by blades 18 and 118 is reduced, this reduces the tip speed of blades 18 and 118 and thus reduces noise created by blades 18 and 118. This feature of blades 18 and 118 folding back allows wind turbine 10 to operate even in high wind conditions.

In an extremely high wind, pitch of front blades 17 and 117 can change to a negative attack angle, which will tend to act as an air brake slowing turbine slow down turning of wind turbine 10.

Figure 10:
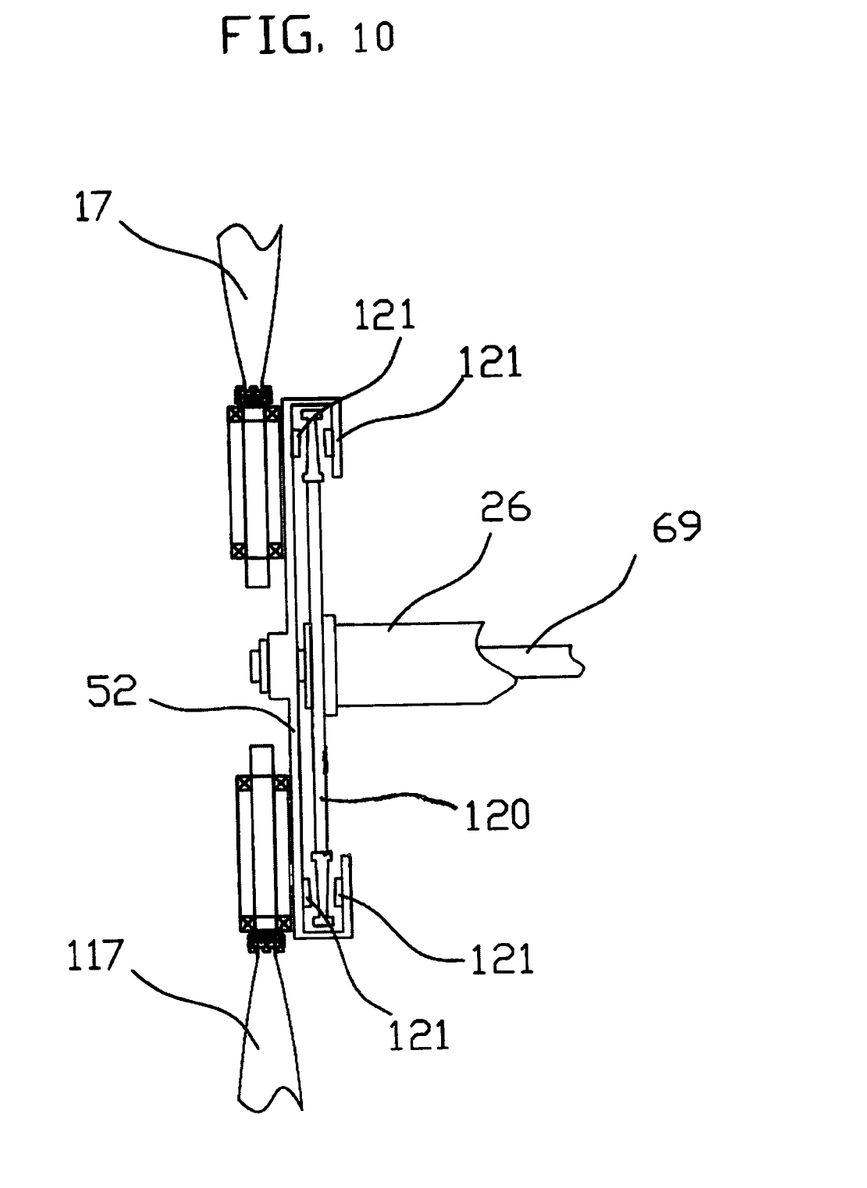
FIG. 10 shows details of the power generator for a wind turbine in accordance with an embodiment of the present disclosure.

FIG. 10 shows that rotor 52 is part of a generator that also includes a plate 120. As rotor 52 rotates, magnets 121 attached within rotor 52 pass over wire coils on a plate 120 attached to shaft housing 26, generating electricity. For example, magnets 121 are strong neodymium magnets. The high magnetic strength of magnets 121 allow significant generation of power.

Figure 11:
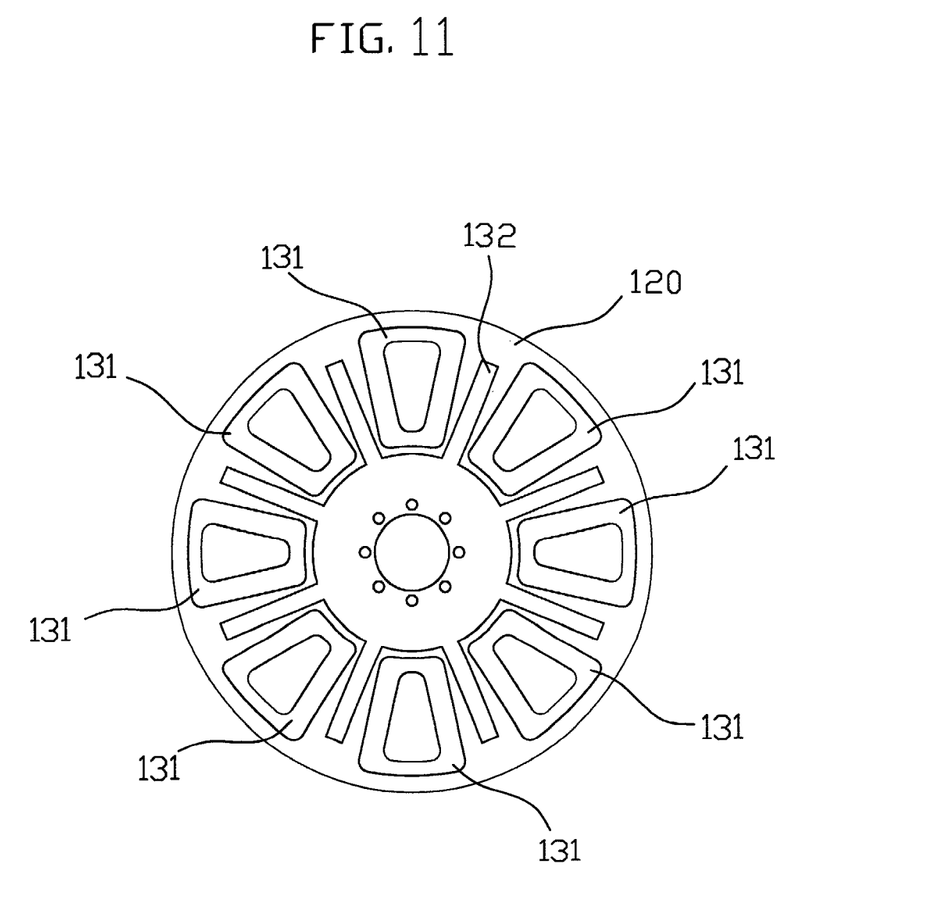
FIG. 11 shows details of a plate used in the power generator shown in FIG. 12 in accordance with an embodiment of the present disclosure.

FIG. 11 shows additional details of the construction of plate 120. Wire coils 131 are embedded in plate 120. A frame 132 provides rigidity to plate 120. Frame 132 also acts as heat sink transmitting heat from coils 131 to shaft housing 26 of wind turbine 10. For example, frame 132 is constructing using a metal such as aluminum. Coils 131 and frame 132 may be coated, for example with a non-conducting material such as epoxy resin. Plate 120 implements a stator that includes multiple coils 131 typically arranged to implement a three phase generator. However the number of coils can differ depending upon application. Coils 131 are only representative as there are typically at least three times as many coils as shown arranged in an overlapping format, as will be understood by those skilled in the art.

Figure 12:
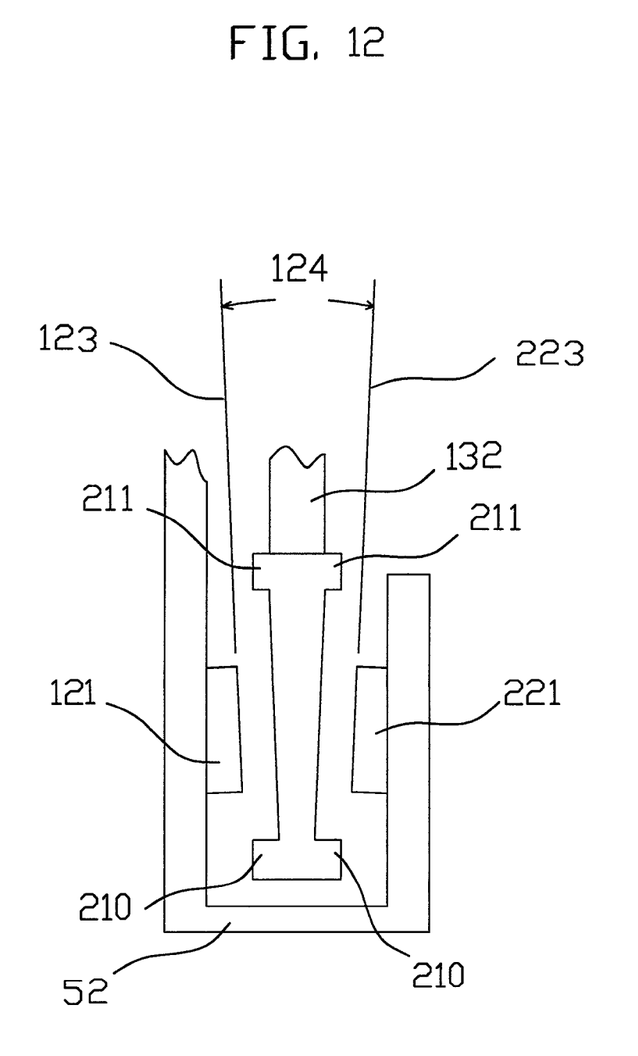
FIG. 12 shows additional details of the plate shown in FIG. 11 in accordance with an embodiment of the present disclosure.

FIG. 12 shows additional detail of a cross section of plate 120. Because of the overlapping of coils 130, a ridge 210 is formed on the outside of plate 120 and another ridge 211 appears in plate 120. A line 123 at the top of magnets 121 is at an angle 124 with respect to a line 223 at a top of magnet 221. Angle 124 is typically one to ten degrees. This angle is optimized to bring magnets 121 and 221 close to coils 131.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A wind turbine, comprising:
    a first set of blades at a front location of the wind turbine;
    a second set of blades behind the first set of blades;
    a folding mechanism that in response to increasing wind velocity allows the second set of blades to fold down toward a back of the wind turbine so that an outer circumference of the second set of blades decreases; and,
    a pitch changing mechanism that in response to the second set of blades folding down toward the back of the wind turbine changes a pitch angle of the first set of blades.

2. A wind turbine as in claim 1:
    wherein the first set of blades turns within an area within a first circumference; and,
    wherein the second set of blades are mounted at a location sufficiently away from an axis of rotation of the wind turbine so that the second set of blades turns within an area that is within a second circumference and that is substantially outside the first circumference.

3. A wind turbine as in claim 1 wherein the pitch changing mechanism additionally changes the pitch angle of the first set of blades in response to a faster rotational velocity of the first set of blades.

4. A wind turbine as in claim 3 wherein the pitch changing mechanism includes:
    a first spring that is compressed against a first stop so that the faster rotational velocity of the first set of blades results in increasing compression force on the first spring.

5. A wind turbine as in claim 4 wherein the pitch changing mechanism additionally includes:
    a second spring that is compressed against a second stop so that folding of the second set of blades toward the back of the wind turbine results in increasing compression force on the second spring.

6. A wind turbine as in claim 1 wherein the pitch changing mechanism includes:
    a spring that is compressed against a stop so that folding of the second set of blades toward the back of the wind turbine results in increasing compression force on the spring.

7. A wind turbine as in claim 1 wherein in sufficiently high winds, the pitch angle of the first set of blades changes to a negative attack angle allowing the first set of blades to act as an air brake for the wind turbine.

8. A wind turbine as in claim 1 additionally comprising:
    a rotor to which the first set of blades is attached; and,
    a plate around which the rotor spins, the plate comprising:
        a rigid frame;
        a plurality of coils of wire; and
        a coating of non-conductive material.

9. A wind turbine as in claim 8 wherein the rigid frame is composed of a metal.

10. A wind turbine as in claim 1 additionally comprising:
    a support by which the wind turbine is anchored to a foundation; and,
    a slip ring located at or near a first end of the support.

11. A wind turbine as in claim 1 wherein the first set of blades includes two, three or four blades and wherein the second set of blades includes two, three or four blades.

12. A method for protecting a wind turbine against effects of strong wind comprising:
    placing a first set of blades at a front location of the wind turbine;
    placing a second set of blades behind the first set of blades;
    folding the second set of blades down toward a back of the wind turbine so that an outer circumference of the second set of blades decreases in response to increasing wind velocity; and,
    changing a pitch angle of the first set of blades to be more parallel to wind direction in response to the folding of the second set of blades down toward the back of the wind turbine.

13. A method as in claim 12 wherein changing the pitch angle includes:
    increasing compression force on a first spring in response to folding the second set of blades down toward the back of the wind turbine where compressed length of the first spring affects the pitch angle.

14. A method as in claim 13, additionally comprising:
    increasing compression force on a second spring in response to faster rotational velocity of the first set of blades where compressed length of the second spring affects pitch angle.

15. A wind turbine, comprising:
    a first set of blades at a front location of the wind turbine;
    a second set of blades behind the first set of blades;
    a folding mechanism that in response to increasing wind velocity allows the second set of blades to fold down toward a back of the wind turbine so that an outer circumference of the second set of blades decreases; and,
    a pitch changing mechanism that allows a pitch angle of the first set of blades to be affected in response to the second set of blades folding down toward the back of the wind turbine.

16. A wind turbine as in claim 15, wherein the pitch changing mechanism includes a spring that is compressed against a stop so that folding of the second set of blades toward the back of the wind turbine results in increasing compression force on the spring.

17. A wind turbine as in claim 15, wherein in sufficiently high winds, pitch angle of the first set of blades changes to a negative attack angle allowing the first set of blades to act as an air brake for the wind turbine.

18. A wind turbine as in claim 15 wherein the pitch changing mechanism additionally changes the pitch angle of the first set of blades in response to a faster rotational velocity of the first set of blades.

19. A wind turbine as in claim 18 wherein, the pitch changing mechanism includes a spring that is compressed against a stop so that folding of the second set of blades toward the back of the wind turbine results in increasing compression force on the spring, the compression force on the spring serving to calibrate how much the pitch changing mechanism changes the pitch angle of the first set of blades in response to the faster rotational velocity of the first set of blades.

20. A wind turbine as in claim 15 wherein, the pitch changing mechanism allows the pitch angle of the first set of blades to change to be more parallel to wind direction in response to the second set of blades folding down toward the back of the wind turbine.

* * * * *